United States Patent
Singh et al.

(10) Patent No.: US 12,041,299 B2
(45) Date of Patent: Jul. 16, 2024

(54) INTERACTIVE SMART MEDIA DEVICE

(71) Applicant: ARRIS Enterprises LLC, Suwanee, GA (US)

(72) Inventors: Virendra Singh, Karnataka (IN); Vinod Jatti, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/573,741

(22) Filed: Jan. 12, 2022

(65) Prior Publication Data

US 2022/0248082 A1 Aug. 4, 2022

Related U.S. Application Data

(60) Provisional application No. 63/145,098, filed on Feb. 3, 2021.

(51) Int. Cl.
*H04N 21/439* (2011.01)
*H04N 21/24* (2011.01)
*H04N 21/422* (2011.01)
*H04N 21/81* (2011.01)

(52) U.S. Cl.
CPC ..... *H04N 21/4394* (2013.01); *H04N 21/2401* (2013.01); *H04N 21/2402* (2013.01); *H04N 21/42203* (2013.01); *H04N 21/8106* (2013.01)

(58) Field of Classification Search
CPC .......... H04N 21/4394; H04N 21/2401; H04N 21/2402; H04N 21/42203; H04N 21/8106; H04N 21/233; H04N 21/26603; H04N 21/4396; H04N 21/4856; H04N 21/4884;
(Continued)

(56) References Cited

U.S. PATENT DOCUMENTS

| 2002/0097984 | A1 | 7/2002 | Abecassis |
| 2020/0111474 | A1* | 4/2020 | Kumar .................... G10L 15/19 |
| 2020/0117714 | A1* | 4/2020 | Mack .................... G10L 13/086 |

(Continued)

OTHER PUBLICATIONS

International Search Report and the Written Opinion of the International Searching Authority dated Apr. 12, 2022 in International (PCT) Application No. PCT/US2022/012064.
(Continued)

*Primary Examiner* — Alazar Tilahun

(74) *Attorney, Agent, or Firm* — Wenderoth, Lind & Ponack, L.L.P.

(57) ABSTRACT

An apparatus, method, and computer-readable recording medium act upon a voice input and replay a portion of streaming media data. The smart media device has a controller, a display, a buffer for maintaining a portion of streaming media data, a speaker, a microphone, a non-transitory memory storing a program, and a communication interface configured to establish communication connections with a remote server. The smart media device receives streaming media data for output to the display and speaker from the remote server, stores a portion of the streaming media data within the buffer, receives a voice command via the input microphone while media content is output to the display and speaker, generates a data representation of dialog contained within the buffer, and outputs the data representation of dialog to the display.

20 Claims, 4 Drawing Sheets

(58) Field of Classification Search
CPC ..... H04N 21/8456; G06F 40/58; G10L 13/00; G10L 15/26
See application file for complete search history.

(56) References Cited

U.S. PATENT DOCUMENTS

| | | | |
|---|---|---|---|
| 2020/0213680 A1* | 7/2020 | Ingel | G10L 13/00 |
| 2020/0320984 A1* | 10/2020 | Kuczmarski | G06N 20/00 |
| 2022/0014817 A1* | 1/2022 | Zubalsky | H04N 21/44 |

OTHER PUBLICATIONS

International Preliminary Report on Patentability and Written Opinion issued Aug. 17, 2023 in International Application No. PCT/US2022/012064.

* cited by examiner

INTERACTIVE SMART MEDIA DEVICE

TECHNICAL FIELD

The subject matter of the present disclosure relates generally to management and control of wireless devices in a wireless network.

BACKGROUND

There has been a rapid rise in the use of wireless devices in wireless networks, which has included providing streaming media data from a remote cloud server and a remote data source to smart media devices in a wireless network. The smart media devices support applications along with having significant amounts of data storage that permits users to have some level of control over the presentation and consumption of streaming media data played on a display device and speakers.

One problem that users currently encounter relates to missing dialog from a scene in the streaming media data either because of a distraction that interrupted their focus on watching and hearing the media content or because a portion of the dialog is spoken in a language which is not a desired language for the user. Additionally, there have been advances in language processing that permit spoken words to be recognized from within audio data, that permit language to be rapidly translated from one language to another language, and permit language to be converted from text to speech.

Thus, it would be advantageous and an improvement over the relevant technology to provide a smart media device that may accept voice commands and replay a portion of dialog that a user did not hear and completely understand. The smart media device also may translate dialog into a desired language before replaying the data to the user. All of these actions may occur interactively upon receipt of a voice command from a user.

SUMMARY

An aspect of the present disclosure provides a smart media device for acting upon an audio input from a user in a wireless network, the wireless network configured to communicatively interconnect a gateway device and the smart media device to a remote data source server and a remote cloud server over the Internet. One of the client devices includes a smart media device. In this aspect of the present disclosure, the smart media device comprises a controller, a video display, a buffer for maintaining a portion of streaming media data received from a remote data source, an audio speaker, an audio input microphone, a non-transitory memory storing a program, and a communication interface configured to establish communication connections with a remote data source server and a remote cloud server over the Internet.

The smart media device is configured to execute the program to act upon an audio input to a network device in a wireless network and replay the one or more blocks of dialog of streaming media data received from a remote data source.

In an aspect of the present disclosure, the smart media device receives streaming media data for output to the video display device and audio speaker from remote data source, stores a most recently received one or more blocks of dialog of the streaming media data within the buffer of the smart media device, receives an audio command via the audio input microphone while media content is output by the smart media device to the video display device and speaker, generates a data representation of dialog contained within the buffer of the smart media device, and outputs the data representation of dialog by the smart media device to the video display device.

In another aspect of the present disclosure, the smart media device further determines whether or not the data representation of the one or more blocks of dialog from the buffer of the smart media device is to be output in an original language or specified language, and when the smart media device determines that the data representation of the one or more blocks of dialog from the buffer of the smart media device is to be output in the specified language not matching the original language, translates the data representation of dialog into the desired language.

In another aspect of the present disclosure, the data representation of the one or more blocks of dialog contains a fixed time period of data ending when the voice command is received.

In another aspect of the present disclosure, the data representation of the one or more blocks of dialog contains dialog from an identified voice speaking within the dialog contained within the buffer of the smart media device when the voice command is received.

In another aspect of the present disclosure, the data representation of the one or more blocks of dialog contains dialog from a scene being output to the speaker and the video display device when the audio command is received.

In another aspect of the present disclosure, the translation of the data representation of the one or more blocks of dialog is performed within a cloud server.

In another aspect of the present disclosure, the streaming media server corresponds to the remote data source.

An aspect of the present disclosure provides a method for acting upon an audio input from a user in a wireless network, the wireless network configured to communicatively interconnect a smart media device and a gateway device to receive streaming media data from a streaming media server and a cloud server over the Internet, the smart media device comprising a controller, a video display, a buffer for maintaining a portion of streaming media data received from a remote data source, an audio speaker and an audio input microphone. The method receives streaming media data for output to the video display device and audio speaker from the remote data source, stores a most recently received one or more blocks of dialog within the streaming media data within the buffer of the smart media device, receives an voice command via the audio microphone while streaming media data is output by the smart media device to the video display device and speaker, generates a data representation of one or more blocks of dialog contained within the buffer of the smart media device, and output the data representation of one or more blocks of dialog by the smart media device to the video display device.

An aspect of the present disclosure provides a non-transitory computer-readable recording medium in a smart media device for acting upon an audio input from a user in a wireless network. The wireless network is configured to communicatively interconnect the gateway device, one or more wireless extenders, and one or more client devices and the non-transitory computer-readable recording medium stores one or more programs which, when executed by a network controller of the gateway device, performs the steps of the methods described above.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It also should be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the drawings, like reference numbers generally indicate identical, functionally similar, and/or structurally similar elements.

DETAILED DESCRIPTION

Figure 1:
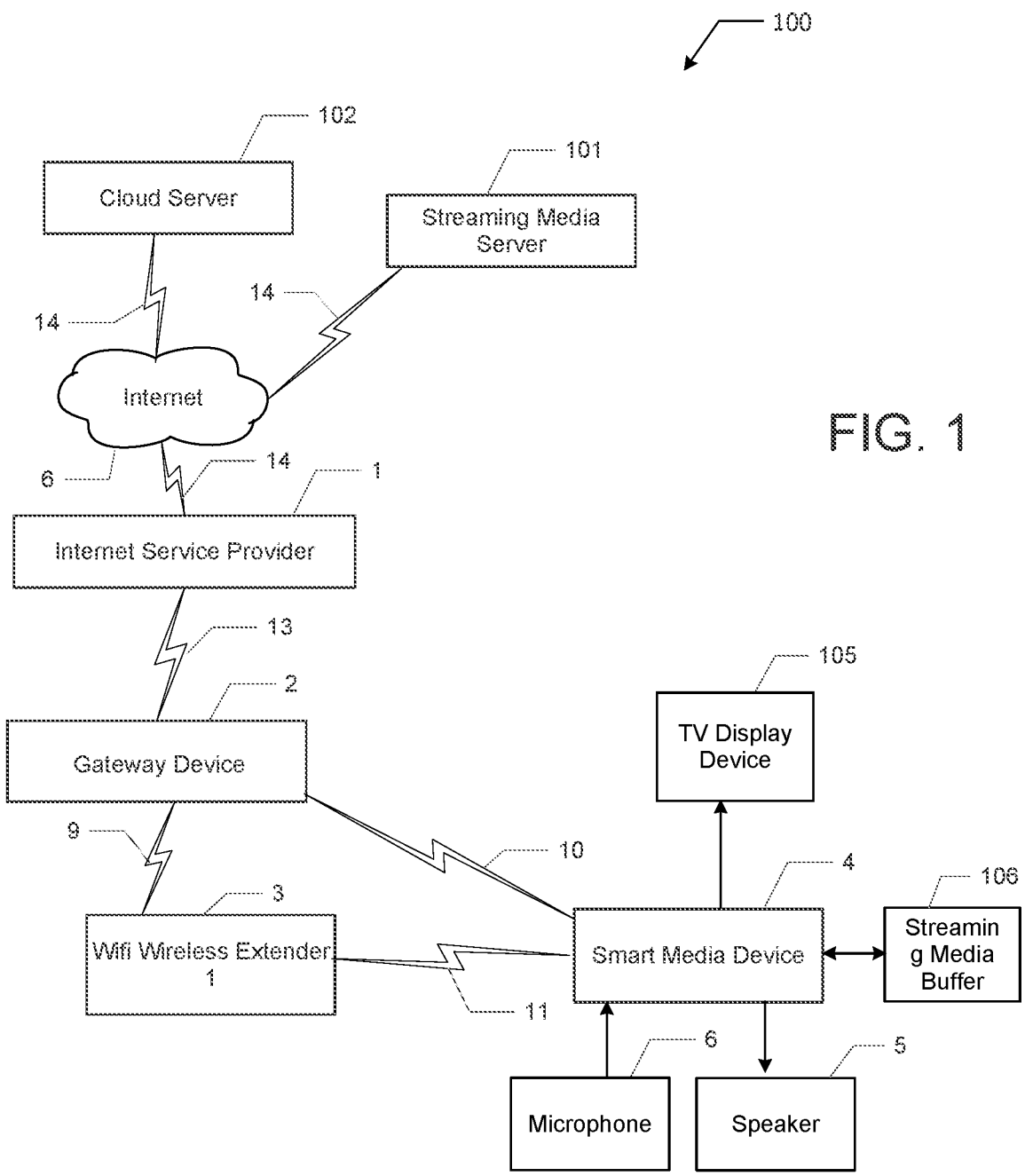
FIG. 1 is a schematic diagram of a system according to an embodiment of the present disclosure.

This application relates in general to a system and method for management and control of wireless devices in a wireless network, and more specifically, to a system and method for a smart media device acting upon an audio input to a network device in a wireless network according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

FIG. 1 is a schematic diagram of a system according to an embodiment of the present disclosure. As shown in FIG. 1, the main elements of the system include a gateway device 2 connected to the Internet 6 via an Internet Service Provider (ISP) 1 and also connected to different wireless devices such as a wireless extender 3 and client device 4. While FIG. 1 only illustrates one wireless extender 3 and one client device 4, the present disclosure contemplates one or more wireless extenders 3, one or more client devices 4, or any combination thereof. As shown, a system shown in FIG. 1 includes wireless devices (e.g., wireless extender 3 and client device 4) that may be connected in one or more wireless networks (e.g., private, guest, iControl, backhaul or Internet of things (IoT)) within the system. Additionally, there could be some overlap between wireless devices (e.g., wireless extender 3 and client device 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming media server 101 or any cloud server 102 providing streaming media data and other content data to a smart media device 4. The smart media device 4 buffers audio content from the streaming media data to replay prior dialog included within the streaming media data that was most recently or last output via the display device 105 and/or the speakers 5 in response to a voice command received from the user via the microphone 6. The streaming media data typically contains dialog spoken by characters depicted within the streaming media data. This dialog may be organized into blocks of dialog spoken by one of the characters or by one or more characters within a defined scene within a portion of the streaming media data. These one or more organized blocks of dialog that has already been out to the display device 105 define the dialog data to be replayed by the smart media device 4.

The smart media device 4, either internally or with the processing performed in the cloud server 102, in the streaming media server 101, or both, also may translate the one or more blocks of dialog data stored within a buffer 106 into a desired language before replaying the one or more blocks of dialog data to the user. The one or more blocks of dialog data stored within the buffer 106 typically is stored as a digital representation of the streaming media audio data. As such, the translation of the dialog into the desired language requires the dialog to be converted into a text representation corresponding to the language used within the streaming media data, requires the text representation of the dialog to be translated into a selected language, and requires the translated representation of the one or more blocks of dialog data to be converted from text to speech for output to the speaker 5.

The ISP 1 connects the gateway device 2, and thus all of its attached local network clients, to the Internet 6. The connection 14 between the Internet 6 and the ISP 1 and the connection 13 between the ISP 1 and the gateway device 2 can be implemented, for example, using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line, a public switched data network (PSDN), a global Telex network or a 2G, 3G, 4G or 5G network.

The connection 13 can further include as some portion thereof a broadband network connection, an optical network connection or other similar connections. For example, the connection 13 can also be implemented using a fixed wireless connection that operates in accordance with, but is not limited to, 3rd Generation Partnership Project (3GPP) Long Term Evolution (LTE) or 5G protocols.

The gateway device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It also is contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content and playing over-the-top (OTT)- or multiple system operator (MSO)-provided content.

The connection 9 between the gateway device 2, the wireless extender 3, and client device 4 can be implemented using a wireless connection in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the citizens broadband radio service (CBRS), 2.4 GHz, 5 GHz or 6 GHz bands. Additionally, the connection 9 can be implemented using a wireless connection that operates in accordance with, but is not limited to, RF4CE, ZigBee, Z-Wave or IEEE 802.15.4 protocols. It also is contemplated by the present disclosure that the connection 9 can include connections to a media over coax (MoCA) network. One or more of the connections 9 also can be a wired Ethernet connection.

A wireless extender 3 can be, for example, hardware electronic devices such as access points used to extend the wireless network by receiving the signals transmitted by the gateway device 2 and rebroadcasting the signals to, for example, a client device 4, which may be out of range of the gateway device 2. The wireless extender 3 also can receive signals from a client device 4 and rebroadcast the signals to the gateway device 2 or other client devices 4.

The connections 11 between the wireless extender 3 and the client device 4 are implemented through a wireless connection that operates in accordance with any IEEE 802.11 Wi-Fi protocols, Bluetooth protocols, Bluetooth Low Energy (BLE) protocols or other short-range protocols that operate in accordance with a wireless technology standard for exchanging data over short distances using any licensed or unlicensed band such as the CBRS, 2.4 GHz, 5 GHz or 6 GHz bands. Additionally, the connection 11 can be implemented using a wireless connection that operates in accordance with, but is not limited to, RF4CE, ZigBee, Z-Wave or IEEE 802.15.4 protocols. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, and cellular networks, and interconnect with other devices via Wi-Fi and Bluetooth or other wireless hand-held consumer electronic devices capable of executing and displaying content received through the gateway device 2. Additionally, the client device 4 can be a TV, an IP/QAM STB or an SMD that is capable of decoding audio/video content and playing OTT- or MSO-provided content received through the gateway device 2. In the particular embodiment of FIG. 1, a smart media device 4 is one of the client devices on the local network created by a gateway 2. A display device 105 is attached to the smart media device 4 to provide output of the streaming media data from the streaming media server 101 and/or the cloud server 102. A microphone 6 and a speaker 5 also may be connected to the smart media device 4.

In the embodiment of FIG. 1, the cloud server 102 and the streaming media server 101 are shown to be separate Internet-based computing devices. One of ordinary skill will recognize that these two computing systems 101-102 may be combined into a single web platform. Additionally, the speaker 5 and microphone 6 are shown to be separate from the display device 105 and the smart media device 4. The microphone 6 and speaker 5 may be integrated into either the smart media device 4 or into the display device 105. Alternatively, the speaker 5 used as part of the present disclosure also may be present in addition to speakers ordinarily part of a television or similar media display device.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 also can be implemented, for example, through a WAN, a LAN, a VPN, MANs, PANs, WLANs, SANs, a DOCSIS network, a fiber optics network (e.g., FTTH, FTTX, or HFC), a PSDN, a global Telex network or a 2G, 3G, 4G or 5G network.

The connection 10 also can be implemented using a wireless connection in accordance with Bluetooth, Bluetooth Low Energy (BLE) or other short-range protocols that operate in accordance with a wireless technology standard for exchanging data over short distances using any licensed or unlicensed band such as the CBRS, 2.4 GHz, 5 GHz or 6 GHz bands. One or more of the connections 10 also can be a wired Ethernet connection.

Figure 2:
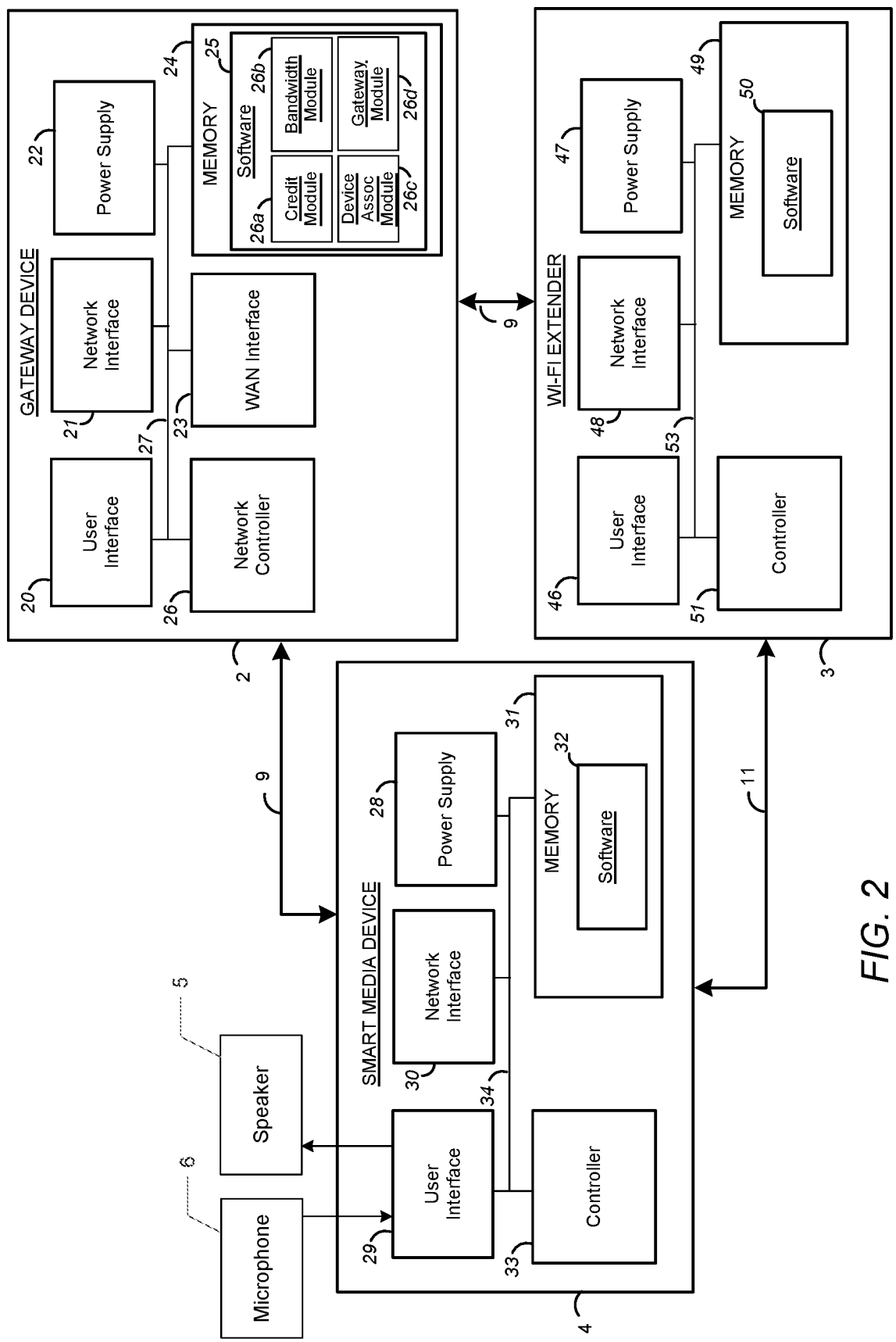
FIG. 2 is a more detailed schematic diagram of an exemplary gateway device, client device, and wireless extender implemented in the system of FIG. 1 according to an embodiment of the present disclosure.

A detailed description of the exemplary internal components of the gateway device 2, the wireless extender 3, and the client device 4 shown in FIG. 1 will be provided in the discussion of FIG. 2. However, in general, it is contemplated by the present disclosure that the gateway device 2, the wireless extender 3, and the client device 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all or some of the computing components in the gateway device 2, the wireless extenders 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3, and an exemplary smart media device 4 implemented in the system of FIG. 1 according to an embodiment of the present disclosure. Although FIG. 2 only shows one wireless extender 3 and one smart media device 4, the wireless extender 3 and the smart media device 4 shown in the figure are meant to be representative of the other wireless extenders 3 and client devices 4 shown in FIG. 1. Similarly, the connections 9 between the gateway device 2, the wireless extender 3, and the smart media device 4 shown in FIG. 2 are meant to be exemplary connections and are not meant to indicate all possible connections between the gateway devices 2, one or more wireless extender 3, and one or more smart media device 4. Additionally, it is contemplated by the present disclosure that the number of gateway devices 2, wireless extenders 3, and smart media devices 4 is not limited to the number of gateway devices 2, wireless extenders 3, and smart media device 4 shown in FIGS. 1 and 2.

Now referring to FIG. 2 (e.g., from left to right), the smart media device 4 can be, for example, a computer, a portable device, an electronic tablet, an e-reader, a personal digital assistant (PDA), a smart phone, a smart speaker, an IoT device, an iControl device, portable music player with smart capabilities capable of connecting to the Internet, cellular networks, and interconnect with other devices via Wi-Fi and Bluetooth or other wireless hand-held consumer electronic devices capable of executing and displaying the content received through the gateway device 2. Additionally, the client device 4 can be a TV, an IP/QAM STB, or an SMD that is capable of decoding audio/video content and playing OTT- or MSO-provided content received through the gateway device 2.

As shown in FIG. 2, the smart media device 4 includes a power supply 28, user interface 29, network interface 30, a memory 31, and a controller 33. The power supply 28 provides power to the internal components of the smart media device 4 through the internal bus 34. The power supply 28 can be a self-contained power source such as a battery pack with an interface to be powered through an electrical charger connected to an outlet (e.g., either directly or by way of another device). The power supply 28 also can include a rechargeable battery that can be detached allowing for replacement such as nickel-cadmium (NiCd), nickel metal hydride (NiMH), lithium-ion (Li-ion), or lithium polymer (Li-pol) batteries.

The user interface 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the smart media device 4. The network interface 30 can include, but is not limited to, various network cards, interfaces, and circuitry implemented in software and/or hardware to enable communications with the gateway device 2 and the wireless extender 3 using the wireless protocols in accordance with connection 9 (e.g., as described with reference to FIG. 1).

The memory 31 includes a single memory or one or more memories or memory locations that include, but are not limited to, a random access memory (RAM), a dynamic random access memory (DRAM), a memory buffer 106, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software or algorithms for controlling the general function and operations of the client device 4 in accordance with the embodiments described in the present disclosure (e.g., including the optimized onboarding of client devices according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP) or other similar processing device capable of executing any type of instructions, algorithms or software for controlling the operation and functions of the client device 4 in accordance with the embodiments described in the present disclosure. Communications between the components (e.g., 28-31 and 33) of the client device 4 may be established using an internal bus 34.

The wireless extender 3 can be, for example, a hardware electronic device such as an access point used to extend a wireless network by receiving the signals transmitted by the gateway device 2 and rebroadcasting the signals to client devices 4, which may be out of range of the gateway device 2. The wireless extender 3 also can receive signals from the client devices 4 and rebroadcast the signals to the gateway device 2, SMD 4, or other client devices 4.

As shown in FIG. 2, the wireless extender 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the wireless extender 3. The power supply 47 provides power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 also can include a rechargeable battery that can be detached allowing for replacement such as NiCd, NiMH, Li-ion, or Li-pol batteries.

The network interface 48 can include various network cards, interfaces, and circuitry implemented in software and/or hardware to enable communications with the client device 4 and the gateway device 2 using the wireless protocols in accordance with connection 9 (e.g., as described with reference to FIG. 1). The memory 49 can include a single memory or one or more memories or memory locations that include, but are not limited to, a RAM, a DRAM, a memory buffer 106, a hard drive, a database, an EPROM, an EEPROM, a ROM, a flash memory, logic blocks of an FPGA, hard disk or any other various layers of memory hierarchy.

The memory 49 can be used to store any type of instructions, software or algorithm including software 50 associated with controlling the general functions and operations of the wireless extender 3 in accordance with the embodiments described in the present disclosure (e.g., including optimized onboarding of client devices according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP or other similar processing device capable of executing any type of instructions, algorithms or software for controlling the operation and functions of the wireless extender 3 in accordance with the embodiments described in the present disclosure. General communications between the components (e.g., 46-49 and 51) of the wireless extender 3 may be established using the internal bus 53.

The gateway device 2 can be, for example, a hardware electronic device that can combine the functions of a modem, an access point, and/or a router for providing content received from the content provider 1 to network devices (e.g., wireless extenders 3, client devices 4,) in the system. It is also contemplated by the present disclosure that the gateway device 2 can include the function of, but is not limited to, an IP/QAM STB or SMD that is capable of decoding audio/video content and playing OTT- or MSO-provided content.

As shown in FIG. 2, the gateway device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3 and client device 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance connection 10 (e.g., as described with reference to FIG. 1).

The power supply 22 provides power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 also can include a rechargeable battery that can be detached allowing for replacement such as NiCd, NiMH, Li-ion or Li-pol batteries. The WAN interface 23 may include various network cards and circuitry implemented in software and/or hardware to enable communications between the gateway device 2 and the ISP 1 using the wireless protocols in accordance with connection (e.g., as described with reference to FIG. 1).

The memory 24 includes a single memory or one or more memories or memory locations that include, but are not limited to, a RAM, a DRAM, a memory buffer 106, a hard drive, a database, an EPROM, an EEPROM, a ROM, a flash memory, logic blocks of a FPGA, hard disk or any other various layers of memory hierarchy. The memory 24 can be used to store any type of instructions, software or algorithm including software 25 for controlling the general functions and operations of the gateway device 2 and performing management functions related to the other devices (wireless extenders 3 and client device 4) in the network in accordance with the embodiments described in the present disclosure.

The network controller 26 controls the general operations of the gateway device 2 as well as performs management functions related to the other devices (wireless extenders 3 and client device 4) in the network. The network controller can include, but is not limited to, a CPU, a hardware microprocessor, a hardware processor, a multi-core processor, a single core processor, a FPGA, a microcontroller, an ASIC, a DSP or other similar processing device capable of executing any type of instructions, algorithms or software for controlling the operation and functions of the gateway device 2 in accordance with the embodiments described in the present disclosure. Communications between the components (e.g., 20-22, 24, and 26) of the gateway device 2 may be established using the internal bus 27.

Figure 3:
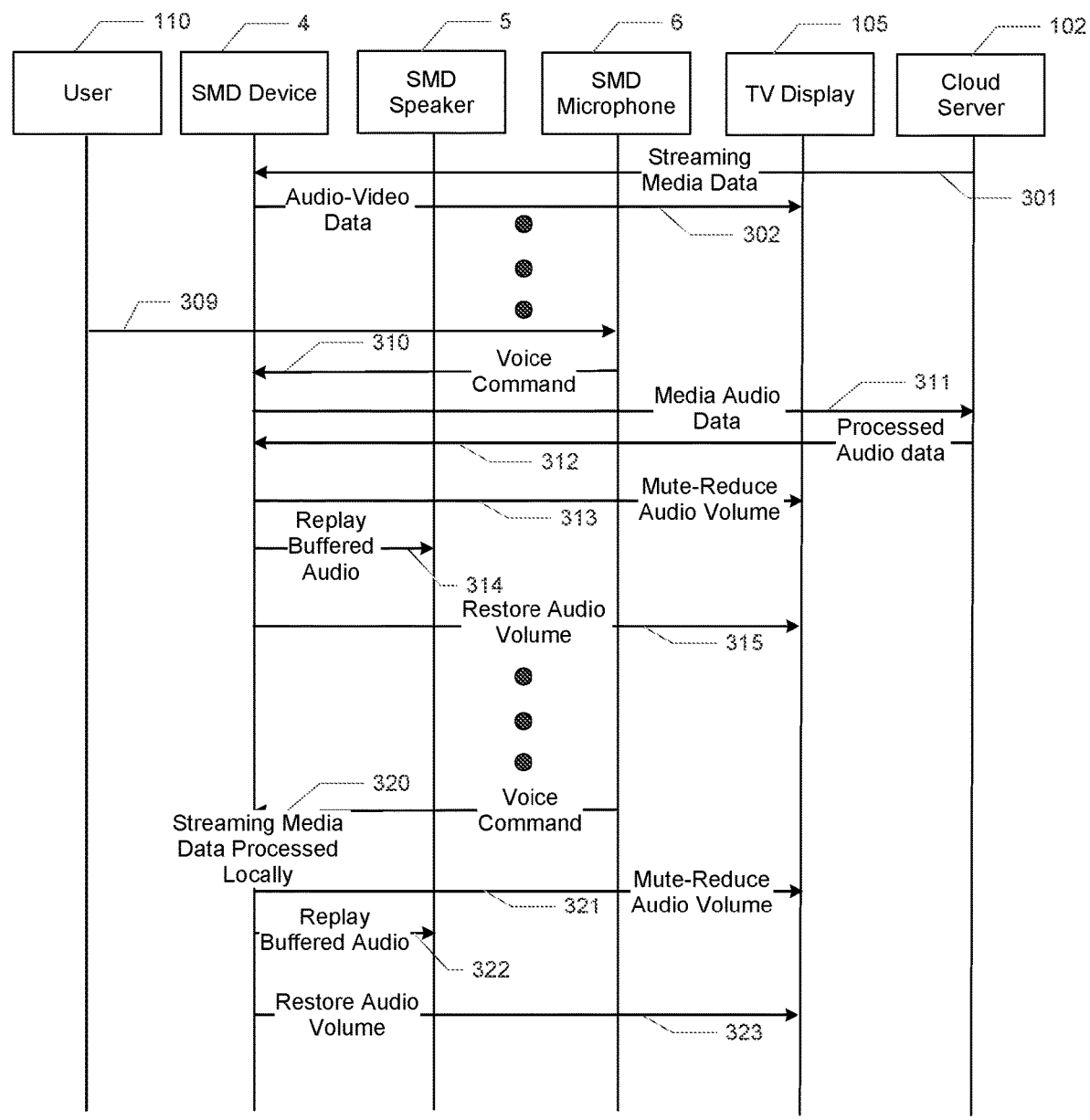
FIG. 3 illustrates a method and algorithm for a smart media device acting upon an audio input to a network device in a wireless network according to an embodiment of the present disclosure.

FIG. 3 illustrates a method and algorithm for a smart media device acting upon an audio input to a network device in a wireless network according to an embodiment of the present disclosure. It is assumed that the smart media device 4 and the gateway device 2 of FIG. 2, include their respective software 25, 32, 50 stored in their respective memories 24, 31, 49 which, when executed by their respective controllers 26, 33, 51, perform the functions and operations in accordance with the embodiments described in the present disclosure (e.g., including algorithm for a smart media device acting upon an audio input according to the embodiments of the present disclosure).

Although FIG. 3 shows one gateway device 2 and one smart media device 4 (e.g., smart media device 4), it is contemplated by the present disclosure that the method and algorithm can be applied to any number of gateway devices 2, client devices 4, and wireless extenders 3 for providing optimized onboarding of devices to any number of wireless networks in the system of FIG. 1.

As shown in FIG. 3, streaming media data 301 is transmitted from a cloud server 102 to the smart media device 4 over the Internet 6. The smart media device 4 outputs the audio and video data 302 from the streaming media data to the display device 105 for consumption by a user 110. As noted above, the audio and video data 302 may be output to the user using speakers integrated into the display device 105 and/or to the speaker 5 attached to and/or included within the smart media device 4. The streaming media data also is stored into a buffer 106 for possible later use.

The user 110 provides a voice command 309 the microphone 6 for receipt 310 by the smart media device 4 to replay a data representation of a most recent one or more blocks of dialog data that has just been output to the display device 105. The voice command 310 may specify whether or not the data representation of the one or more blocks of dialog data to be replayed is to consist of dialog contained within a fixed-length time period, for example, the fixed-length time period ending when the voice command 310 was received by the smart media device 4.

The voice command 310 may include a value for determining the dialog to be replayed. For example, the value may be indicative of the length of a fixed time period. The value for the length of the fixed-length time period may be defined by the smart media device 4, may be a default value defined within a user controllable setting to the smart media device 4 when the voice command does not provide the length of the time period, any may be any other time period, or a combination thereof.

The value may also indicate that the dialog to be replayed should be determined based on the content of the streaming media data 301, for example dialog contained within a scene of the streaming media data. The streaming media data 301 may be processed to determine when the most recent dialog was started by an identified voice or source in the data representation of the one or more blocks of dialog; for example, the last identified voice received in the data representation of the one or more blocks of dialog may be identified and the beginning of this dialog from this identified voice may be determined to be replayed for the user. For example, the data representation of the one or more blocks of dialog can contain dialog from a scene. The streaming media data can comprise the scene, such as, dialog can be contained within the scene that is output to a speaker by the smart media device. A scene can be defined by a voice that is identified within the one or more blocks of dialog contained with the buffer of the smart media device. For example, a scene can comprise all the dialog by an identified voice within the streaming media data.

Similarly, the streaming media data 301 also may be processed to determine the beginning of the scene or the start of the one or more blocks of dialog data such that the dialog replayed corresponds to the dialog from all voice inputs identified in the most recent scene. The beginning of each scene may be determined from chapter indications contained within the streaming media data 301 or any other change of one or more voice inputs and/or location for the scene that may be determined from the streaming media data 301.

Once the dialog to be replayed to the user has been determined, the dialog to be replayed may be translated into a selected or chosen language. For example, a user, an administrator, any other authorized individual or entity, or a combination thereof can configure the smart media device 4 to translate from one language to another language. The selected or chosen language can also be specified within the voice command 310. In this initial example, this translation of the data representation of the one or more blocks of dialog data to be replayed from one language to another language is performed within the cloud server 102. For example, the cloud server 102 receives the one or more blocks of dialog data to be replayed 311 from the smart media device 5. The cloud server 102 returns the data representation of the translated one or more blocks of dialog data to be replayed 312 to the smart media device 4. The data representation of the translated one or more blocks of dialog data to be replayed 312 may be provided as text data, audio data, or a combination of both forms of data. The audio data may be output using the speaker 5 and the text data may be displayed a text shown on the display device 105.

Because the streaming media data 301 continues to be received and output by the display device 105 while the data representation of the one or more blocks of dialog data is replayed, the smart media device 4 mutes or reduces the audio volume of the incoming streaming media data 301 to permit the translated dialog to be replayed to the user via the speakers 5. Once the data representation of the translated dialog has been replayed, the smart media device 4 restores the audio volume to the display device 105 such that streaming media data 301 is output at a default or previously set volume level.

The processing of the one or more blocks of dialog data to be replayed retrieved from the buffer 106 in the above example embodiment may be performed by an application within the smart media device 4 in place of the cloud server 102. In this alternate embodiment, the transfer of the media audio content 311 to the cloud server 102 and the return of the process audio content 312 corresponds to transfer of the data to and from this application within the smart media device 4.

The smart media device 4 may receive another voice command 320 as part of the streaming media data 301. In this example embodiment, the voice command 320 does not require the translation the one or more blocks of dialog data to be replayed from one language to another language. This voice command 320 may include an instruction not to translate the one or more blocks of dialog data to be replayed or may include an instruction that the one or more blocks of dialog data to be replayed is already utilizing the desired language. As such, the one or more blocks of dialog data to be replayed from the buffer 106 may be simply replayed by transmitting the audio data to the speaker 5. The mute-reduce volume operation 321 on the ongoing streaming media data 301 is performed to permit the one or more blocks of dialog data to be replayed from the buffer 106 to be replayed as replay buffered audio 322. As above, the audio volume of the streaming media data 301 is restored 323 once the one or more blocks of dialog data to be replayed has been replayed.

Figure 4:
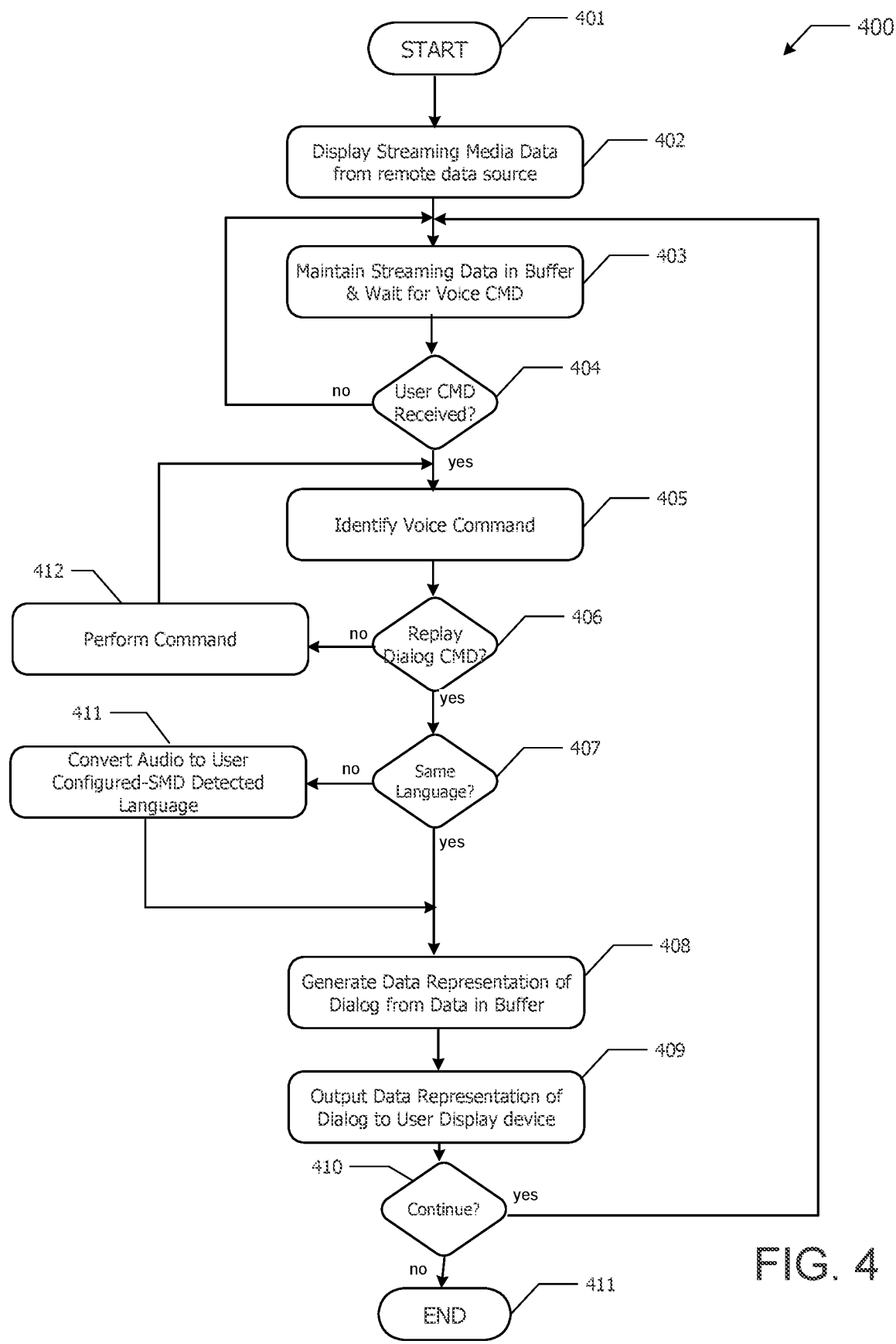
FIG. 4 illustrates a method and algorithm for performing a smart media device acting upon an audio input to a network device in a wireless network according to an embodiment of the present disclosure.

FIG. 4 illustrates a method and algorithm for a smart media device that acts upon an audio input to a network device in a wireless network according to an embodiment of the present disclosure. The exemplary method and algorithm of FIG. 4 illustrate the action taken by the smart media device 4 when receiving streaming media data from a cloud server 102 for display on the display device 105 and a user audio input from the microphone 6. In FIG. 4, it is assumed that the smart media device 4, the gateway device 2, and each of the wireless extenders 3 (not shown in FIGS. 3-4) include their respective software 25, 32, 50 stored in their respective memories 24, 31, 49 which, when executed by their respective controllers 26, 33, 51, perform the functions and operations in accordance with the embodiments described in the present disclosure (e.g., including optimized onboarding of devices according to the embodiments of the present disclosure). Additionally, the smart media device 4 includes a speaker 5, microphone 6, and a display device 105.

The method 400 begins at step 401 and in step 402 streaming media data is transmitted from a remote data source, for example, a cloud server 102 or a streaming media server 101, to the smart media device 4 over the Internet 6. In step 403, the smart media device 4 maintains the buffer 106 for retaining a portion of the streaming media data containing one or more blocks of dialog data for replay to a user 110 upon request. At test step 404, the smart media device 4 determines whether or not a voice command has been received from a user, and if not, the method 400 returns to 403 to continue to maintain the buffer 106 of data portion of the streaming media data containing one or more blocks of dialog data for replay to a user upon request. When the smart media device 4 determines in test step 404 that a voice command has been received, the smart media device 4 identifies any recognized instruction within the voice command from the user in step 405.

In test step 406, the smart media device 4 determines whether or not the voice command corresponds to a replay dialog command, and if not, the process 400 performs any validly recognized command in step 412 and then returns to step 403. When test step 406 determines a replay dialog command has been received, the process 400 continues to test step 407 to determine whether or not the replayed dialog is to be replayed in a translated language. When the smart media device 4 determines in test step 407 that the replayed dialog is to be replayed in a translated language, the process converts and translates the dialog into a selected language in step 411. At step 408, a data representation of the one or more blocks of dialog data to be replayed contained within the buffer 106 is generated. When the smart media device 4 in test step 407 determines that the one or more blocks of dialog data to be replayed is not to be translated, the process 400 continues directly to step 408.

In step 408, the one or more blocks of dialog data to be replayed is identified. As noted above, when the one or more blocks of dialog data to be replayed remains in the original language of the one or more blocks of dialog data, the audio data retrieved from the buffer 106 may be replayed in original form. In step 409, the data representation of one or more blocks of dialog data is output by the smart media device 4 to the speaker 5 and/or the display device 105 based upon configuration of the smart media device 4. The smart media device 4 in step 409 also mutes or reduces the volume level of the incoming streaming media data while the one or more blocks of dialog data to be replayed is output as discussed above in reference to FIG. 3.

Once the smart media device 4 concludes replaying the one or more blocks of dialog data to be replayed, the smart media device 4 determines in test step 411 whether or not the streaming media data 301 is continuing to be received from the cloud server 102, and if so, the process returns to step 403; otherwise, the process 400 ends 411.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A smart media device for outputting a streaming media data to a display device, the smart media device comprising:
    a memory having one or more instructions stored thereon; and
    a processor configured to execute the one or more instructions on the memory to cause the smart media device to:
        receive a streaming media data for output to a video display device and an audio speaker from a cloud server, wherein the streaming media data comprises a dialog;
        receive a voice command via an audio input microphone, wherein the voice command specifies a first language;
        send one or more blocks of a dialog to be replayed, of the received dialog, from a second language to the first language to the cloud server;
        receive a data representation of a translation of the one or more blocks of the dialog to be replayed based on the first language from the cloud server;
        output the streaming media data to the video display device and the audio speaker;
        output the data representation to the video display device while the streaming media data continues to be outputted;
        mute or reduce an audio volume of the streaming media data while the data representation is outputted; and
        restore the audio volume of the streaming media data once the data representation has been replayed.

2. The smart media device according to claim 1, wherein the processor is further configured to execute the one or more instructions to cause the smart media device to:
    determine that the data representation of the one or more blocks of the dialog to be replayed is to be output in first language based on the voice command.

3. The smart media device according to claim 2, wherein the data representation of the one or more blocks of the dialog to be replayed contains a fixed-length time period of data ending when the voice command is received.

4. The smart media device according to claim 2, wherein the data representation of the one or more blocks of the dialog to be replayed contains dialog from a scene output when the voice command is received.

5. The smart media device according to claim 2, wherein the data representation of the one or more blocks of the dialog to be replayed contains dialog from a scene of the streaming media data being output to the audio speaker and the video display device when the voice command is received.

6. The smart media device according to claim 1, wherein the translation of the data representation is performed within the cloud server.

7. The smart media device according to claim 1, wherein the cloud server corresponds to a streaming media server.

8. A method for outputting a streaming media data to a display device, the method comprising:
    receiving a streaming media data for output to a video display device and an audio speaker from a cloud server, wherein the streaming media data comprises a dialog;

receiving a voice command via an audio input microphone, wherein the voice command specifies a first language;

sending one or more blocks of a dialog to be replayed, of the received dialog, from a second language to the first language to the cloud server;

receiving a data representation of a translation of the one or more blocks of the dialog to be replayed based on the first language from the cloud server;

outputting the streaming media data to the video display device and the audio speaker;

outputting the data representation to the video display device while the streaming media data continues to be outputted;

muting or reducing an audio volume of the streaming media data while the data representation is outputted; and restoring the audio volume of the streaming media data once the data representation has been replayed.

9. The method according to claim 8, wherein the method further:

determining that the data representation of the one or more blocks of the dialog to be replayed from the buffer of the smart media device is to be output in the first language based on the voice command.

10. The method according to claim 9, wherein the data representation of the one or more blocks of the dialog to be replayed contains a fixed-length time period of data ending when the voice command is received.

11. The method according to claim 9, wherein the data representation of the one or more blocks of the dialog to be replayed contains dialog from a scene output when the voice command is received.

12. The method according to claim 9, wherein the data representation of the one or more blocks of the dialog to be replayed contains dialog from a scene of the streaming media data being output to the speaker and the video display device when the voice command is received.

13. The method according to claim 9, wherein the translation of the data representation of the one or more blocks of the dialog to be replayed is performed within the cloud server.

14. The method according to claim 13, wherein the cloud server corresponds to a streaming media server.

15. A non-transitory computer-readable recording medium in a smart media device, the non-transitory computer-readable recording medium storing one or more programs which when executed by a controller of the smart media device causes the smart media device to perform one or more steps comprising:

receiving a streaming media data for output to a video display device and an audio speaker from a cloud server, wherein the streaming media data comprises a dialog;

receiving a voice command via an audio input microphone, wherein the voice command specifies a first language;

sending one or more blocks of a dialog to be replayed, of the received dialog, from a second language to the first language to the cloud server;

receiving a data representation of a translation of the one or more blocks of the dialog to be replayed based on the first language from the cloud server;

outputting the streaming media data to the video display device and the audio speaker;

outputting the data representation to the video display device while the streaming media data continues to be outputted;

muting or reducing an audio volume of the streaming media data while the data representation is outputted; and restoring the audio volume of the streaming media data once the data representation has been replayed.

16. The non-transitory computer-readable recording medium according to claim 15, wherein the instructions within the non-transitory computer-readable recording medium when executed by the controller further performs steps comprising:

Determining that the data representation of the one or more blocks of the dialog to be replayed from the buffer of the smart media device is to be output in the first language based on the voice command.

17. The non-transitory computer-readable recording medium according to claim 16, wherein the data representation of the one or more blocks of the dialog to be replayed contains a fixed-length time period of data ending when the voice command is received.

18. The non-transitory computer-readable recording medium according to claim 16, wherein the data representation of the one or more blocks of the dialog to be replayed contains dialog from a scene of the streaming media data output when the voice command is received.

19. The non-transitory computer-readable recording medium according to claim 16, wherein the data representation of the one or more blocks of the dialog to be replayed contains dialog from a scene being output to the speaker and the video display device when the voice command is received.

20. The non-transitory computer-readable recording medium according to claim 16, wherein the translation of the data representation of the one or more blocks of dialog is performed within the cloud server.

* * * * *